R. H. BOWMAN.
COMBINED BOX PRESS AND BOX MAKING APPARATUS.
APPLICATION FILED APR. 21, 1908.
901,676.
Patented Oct. 20, 1908.
3 SHEETS—SHEET 1.
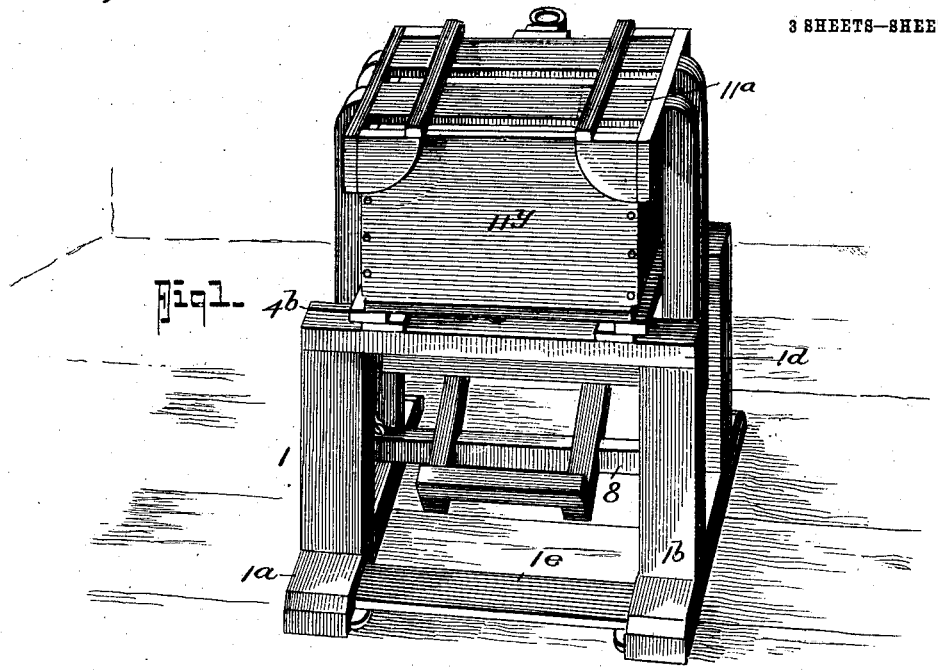
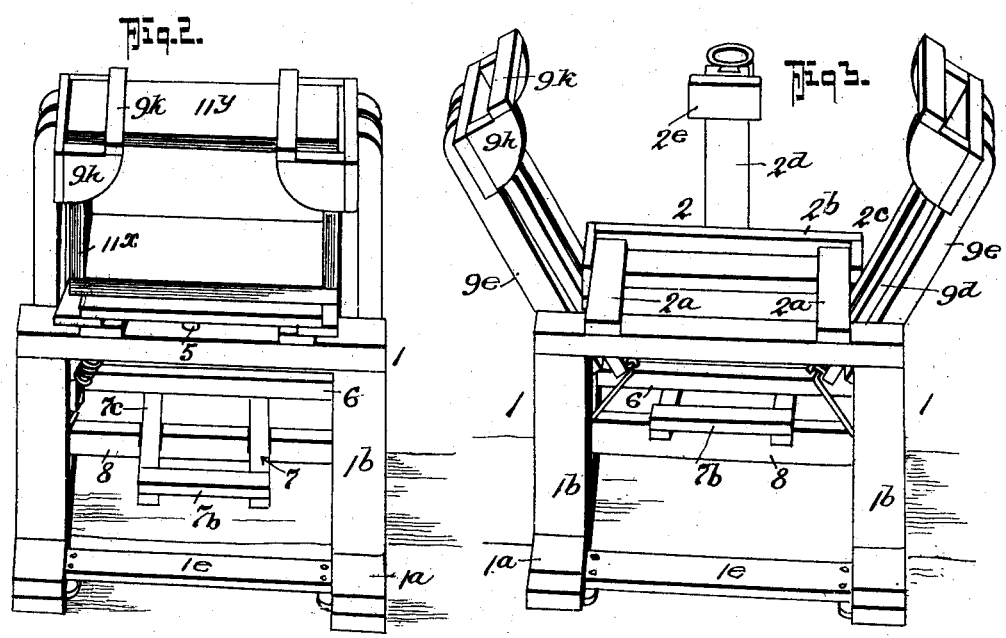
WITNESSES:
John T. Schrott
Chas. H. Wagner
INVENTOR
Robert Henry Bowman
BY
Fred. G. Dieterich
ATTORNEYS

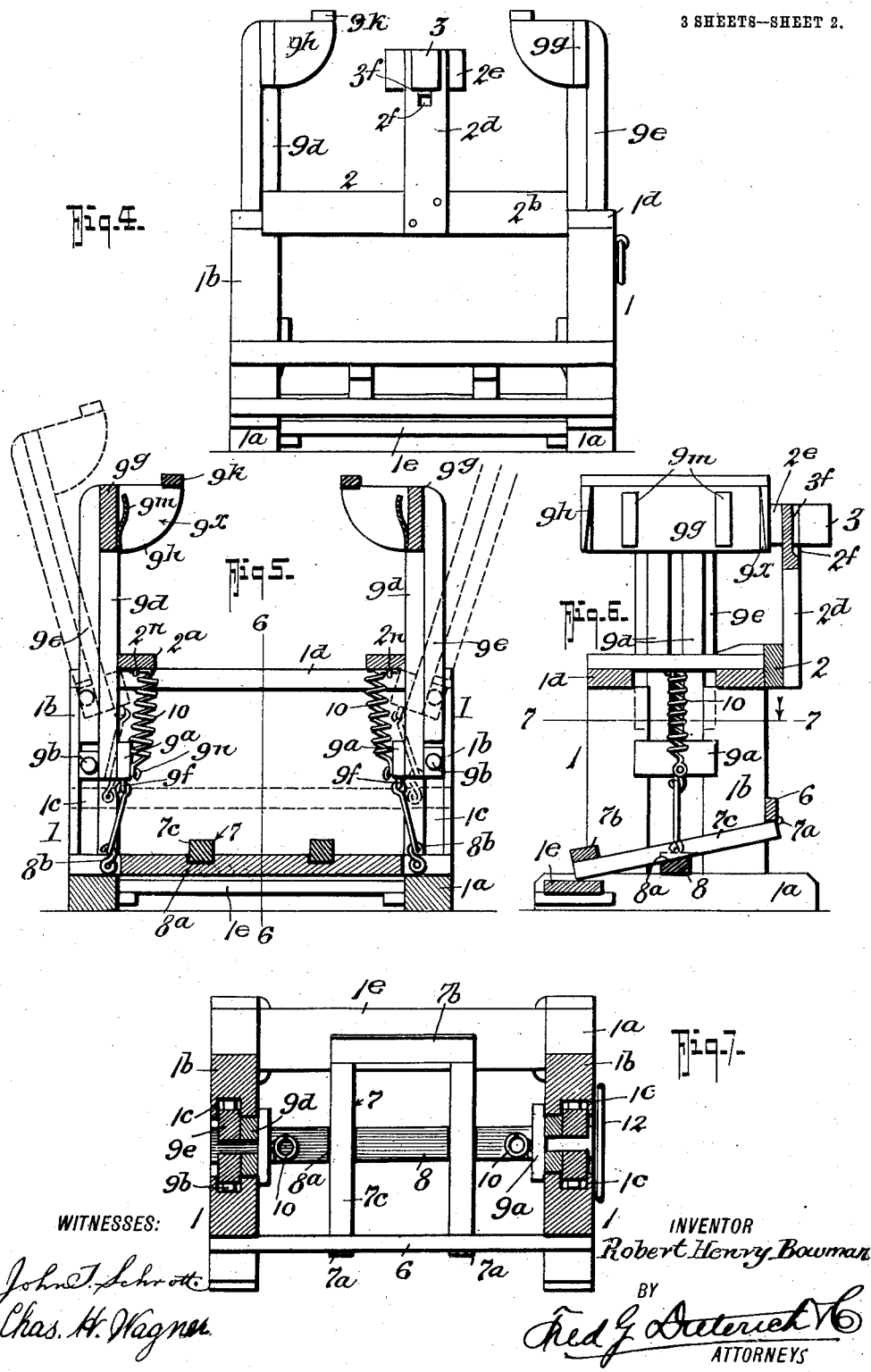

R. H. BOWMAN.
COMBINED BOX PRESS AND BOX MAKING APPARATUS.
APPLICATION FILED APR. 21, 1908.
901,676.
Patented Oct. 20, 1908.
3 SHEETS—SHEET 3.
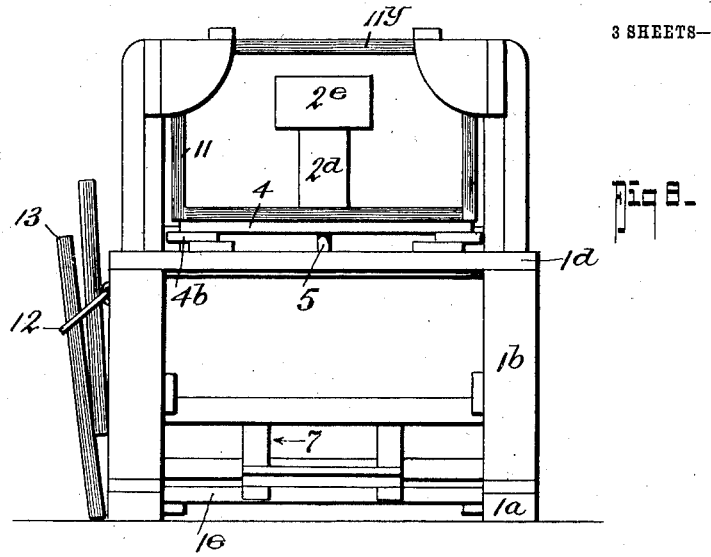
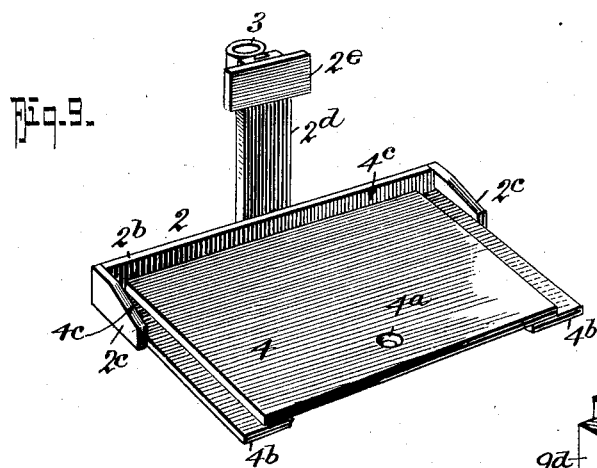
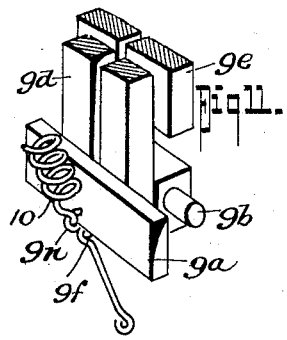
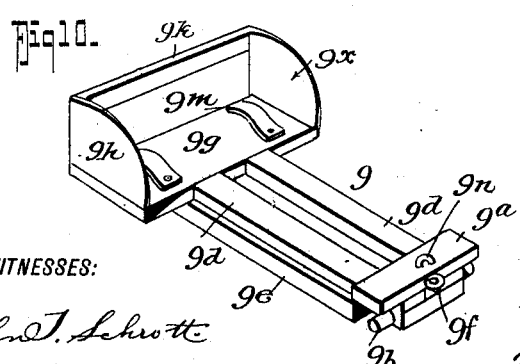
WITNESSES:
John T. Schrott
Chas. H. Wagner
INVENTOR
Robert Henry Bowman
BY
Fred G. Dieterich
ATTORNEYS

UNITED STATES PATENT OFFICE.

ROBERT H. BOWMAN, OF CANON CITY, COLORADO.

COMBINED BOX-PRESS AND BOX-MAKING APPARATUS.

No. 901,676.  Specification of Letters Patent.  Patented Oct. 20, 1908.

Application filed April 21, 1908. Serial No. 428,354.

*To all whom it may concern:*

Be it known that I, ROBERT H. BOWMAN, residing at Canon City, in the county of Fremont and State of Colorado, have invented certain new and useful Improvements in a Combined Box-Press and Box-Making Apparatus, of which the following is a specification.

My invention relates to certain new and useful means in apparatus for pressing down the lids on boxes, crates and the like and holding the lid in place while being fastened down.

The invention is also adapted for use in box or crate making, to assemble or hold the box parts while being fastened together in forming the box.

Generically, the invention consists in a box framework or stand having a top or bed to receive the box, arms or grip racks slidable in the frame and having draw-head devices to operate the same, and clamping heads to coöperate in holding the box parts while being nailed, together with means for separating the racks automatically when at their upward limit of movement to permit free and unobstructed handling of the box or its parts.

My invention also includes an extra top for use when the apparatus is to be adapted to the assembling or manufacturing of boxes or crates.

More specifically my invention also resides in those details of construction and coöperative relation of parts all of which will be first fully described, and then be specifically pointed out in the appended claims, reference being had to the accompanying drawings, in which:—

Figure 1, is a perspective view of my invention, showing how it is used as a box press. Fig. 2, is a similar view showing its use in box making. Fig. 3, is another perspective view showing the position of the parts when ready to receive a box. Fig. 4, is a rear elevation of the parts shown in Fig. 1, the arms being shown closed. Fig. 5, is a central, vertical longitudinal section thereof the arms being opened in dotted lines. Fig. 6, is a central cross section on the line 6—6 of Fig. 5. Fig. 7, is a horizontal section on the line 7—7 of Fig. 4. Fig. 8, is a side elevation of my apparatus showing the parts as in Fig. 2. Fig. 9, is a perspective view of the box holding bed, *per se*. Fig. 10, is a detail perspective view of one of the arms. Fig. 11, is a similar view of the cross head.

Referring now to the accompanying drawings in which like letters and numerals of reference indicate like parts in all of the figures, 1 designates the frame which comprises the base timbers $1^a$ and the standards $1^b$, the base timbers being connected together by the braces $1^e$.

The standards $1^b$ are spaced apart and provided with grooves $1^c$ facing one another to receive the tongues $9^e$ of the arms or grip racks 9, hereinafter again referred to, and the posts $1^b$ are connected at their tops by transverse timbers $1^d$ to which the bed 2 that receives the box is secured.

The bed 2 comprises the bridge timbers $2^a$ that extend across the timbers $1^d$ and are secured thereto and the back stop $2^b$ to which and to the end stops $2^c$ the bridge timbers $2^a$ are also secured.

To the back stop $2^b$ a post $2^d$ is secured that projects upwardly and carries a plate $2^e$ against which the box is to rest and which forms a stop therefor, the plate $2^e$ lying substantially in the same plane with the back stop $2^b$ of the top.

The back of the post $2^d$ is provided with a dove-tailed recess $2^f$ to receive the dove-tailed projection $3^f$ of the cup 3, which is adapted for holding nails while the box parts are being nailed up.

4 designates a supplemental top which has a bolt aperture $4^a$ through which a bolt 5 may be passed into a hole in the front bar $1^d$ to lock the supplemental top 4 in position on the shaft 2, the supplemental top 4 having bars $4^b$ on its under face that are adapted to be held between the bridge timbers $2^a$, and the supplemental top 4 is of less length than the back stop $2^b$ of the top 2 so as to leave grooves $4^c$ into which the box parts may be set in assembling the parts of a box, as will be more fully described hereinafter.

6 designates a cross bar secured to the back of the end posts $1^b$ to which the treadle 7 is hinged as at $7^a$, the treadle 7 projecting to the front of the machine and having a foot engaging bar $7^b$ by means of which it may be operated.

The treadle 7 passes over a cross bar 8 that is held between the posts $1^b$ and is provided with grooves $8^a$ on its upper face to receive the bars $7^c$ of the treadle and the cross bar 8 has pivotally connected hooks $8^b$ which are adapted to hook into eyes $9^f$ on a cross head 9ª that is secured to the bars 9ᵈ of the grip arms 9. The cross head 9ª has laterally projecting hubs 9ᵇ which ride in the grooves 1ᶜ of the posts 1ᵇ, the cross head 9ª riding between said posts.

On the under side a cross bar 9ᵉ is secured to the bars 9ᵈ at the lower end for a purpose presently explained, and the bar 9ᵉ which forms a stop has an eye 9ⁿ to which the coil spring 10, that connects with a hook 2ⁿ on the bridge bars 2ª, is fastened, the springs 10 serving to normally elevate the arms 9 and permit them to move into the position shown in Fig. 3.

The arms 9 at their upper ends terminate in a plate 9ᵍ to the inner face of which leaf or other suitable springs 9ᵐ are secured, and to the side ends of which beveled bracket members 9ʰ are fastened, the bracket members 9ʰ being connected at their top front edges by a cross bar 9ᵏ, as clearly shown in the drawings, and the bracket members 9ʰ have their inner edges beveled as at 9ˣ for a purpose presently to appear.

11 designates the box which may be formed with my apparatus, or to which the lid is adapted to be secured, while 12 designates a wire loop member secured to the end posts 1ᵇ to retain boards 13 from which the box is adapted to be built, the wire members 12 merely serving as a convenient means for holding the boards 13 near the machine, so that they will be readily accessible.

So far as described, the manner in which my invention operates will be best explained as follows: To operate the apparatus, as a box press, the box is placed on the top 2 (the supplemental top 4 being removed, if desired) and the box filled with its desired contents, say apples, and the boards 11ª (or top) for closing the box are then placed on the full box. The foot treadle 7 is then pressed down, which draws the arms 9 into a vertical position with their heads over the ends of the box so that the bar 9ᵏ will come down on top of the boards 11ª, while the springs 9ᵐ and the beveled brackets 9ʰ will serve to bring the boards 11ª into proper alinement. While the operator has his foot on the treadle 7 he may then nail the boards 11ª into place, it being understood that the space between the cross bar 9ᵏ and the plate 9ᵍ of the arms 9 is sufficient to permit nailing of the boards.

Upon releasing the treadle 7 the springs 10 will again draw the parts into the position shown in Fig. 3, to separate the arms 9 and permit the box 11 to be removed.

It should be understood that when the arms 9 are in their upmost position the rails 9ᵉ will be out of the grooves 1ᶜ as they terminate at their bottom ends a short distance from the hubs 9ʰ.

In box making, the supplemental bottom 4 is placed on the bed or top 2 of the machine, as shown in Fig. 8, and the bolt 5 inserted to lock the member 4 in place. The back stop 2 and the end guards 2ᶜ hereinbefore referred to, together with the supplemental top 4 form grooves 4ᶜ, as before stated, to hold the end pieces 11ˣ of the box that is to be made up. The end pieces 11ˣ are placed into the grooves and a side piece 11ʸ is placed on top of the end pieces. (See Fig. 2.) The treadle is then drawn down which brings the top of the arms over the ends of the box, the beveled brackets 9ᵏ bringing the boards in place from the side while the springs 9ᵐ on the plate 9ᵍ shove the board into place lengthwise when the arms 9 are drawn down through the treadle 7 and its connected parts to hold the board 11ʸ in place until the operator has nailed the same to the under post 11ˣ after which the operator releases the treadle 7 and arms 9 return to their normal position. The box is then turned over and the side piece placed thereon in the same general manner and nailed in position, after which the box is again turned over and the top or bottom nailed on in the same manner.

From the foregoing description taken in connection with the accompanying drawings, it is thought the complete construction, operation and many advantages of my invention will be readily understood by those skilled in the art to which the invention appertains.

What I claim is:

1. In a box machine, a main supporting frame having pairs of spaced grooved guides, arms movable therein and having a pivotal connection with said guides, said arms having clamping heads, said clamping heads comprising end stops and top clamping bars to position and hold a lid said frame having a box receiving bed or top, and means for normally holding said arms at their upward limit of movement and out of alinement with said grooved guides.

2. In a box press, a main supporting frame having pairs of grooved guides, arms movable in said grooved guides and having a pivotal connection therewith, said arms having clamping heads, said clamping heads comprising end stops and top clamping bars to position and hold a lid said frame having a box receiving bed or top, combined with means for normally holding said arms at their upward limit of movement and out of alinement with said grooved guides, together with means for first drawing said arms into alinement with said grooved guides and then upon further movement drawing such arms down into said grooved guides to form the box.

3. In a box press, a main supporting frame having pairs of grooved guides, arms movable in said grooved guides and having a pivotal connection therewith, said arms having clamping heads, said clamping heads comprising end stops and top clamping bars to position and hold a lid said frame having a box receiving bed or top, combined with means for normally holding said arms at their upward limit of movement and out of alinement with said grooved guides, together with means for first drawing said arms into alinement with said grooved guides and then upon further movement drawing such arms down into said grooved guides to clamp the box, and means forming a part of the box receiving bed for maintaining the box in position.

4. In a box press and assembling apparatus, a main supporting frame having pairs of side grooved guides, arms vertically movable in said guides, said arms having clamping heads said clamping heads comprising end stops and top clamping bars to hold a lid, a box receiving top or bed secured to said main frame, and a supplemental top secured on said first mentioned top or bed and means for operating said arms to clamp a box to said supplemental top.

5. In a box press, a main supporting frame having side and end standards, and cross braces connecting the same together, said end standards having grooves forming guides, a box receiving bed or top supported by said main frame, means carried by said top to form a guide and stop for the box, arms having clamping heads and tongues to slide in said grooved guides, a cross head carried by said arms having hubs for entering said grooved guides, combined with means for normally holding said arms with their tongues out of said grooved guides, and another means for first drawing said arms with their tongues into alinement with said grooved guides and upon further movement drawing said arms down with their tongues into said grooved guides.

6. In a box press, a main supporting frame having side and end standards, and cross braces connecting the same together, said end standards having grooves forming guides, a box receiving bed or top supported by said main frame, means carried by said top to form a guide and stop for the box, arms having clamping heads and tongues to slide in said grooved guides, a cross head carried by said arms having hubs for entering said grooved guides, combined with means for normally holding said arms with the tongues out of said grooved guides, another means for first drawing said arms with their tongues into alinement with said grooved guides, and upon further movement drawing such arms down with the tongues into said grooved guides, the clamping heads of said arms comprising side plates and bracket members secured thereto, and a cross brace connecting the front ends of said bracket members and spaced from such side plates.

7. In a box press, a main supporting frame having side and end standards, and cross braces connecting the same together, said end standards having grooves forming guides, a box receiving bed or top supported by said main frame, means carried by said top to form a guide and stop for the box, arms having clamping heads and tongues to slide in said grooved guides, a cross head carried by said arms having hubs for entering said grooved guides, combined with means for normally holding said arms with their tongues out of said grooved guides, another means for first drawing said arms with their tongues into alinement with said grooved guides and upon further movement drawing said arms down with their tongues into said grooved guides, the clamping heads of said arms comprising side plates and bracket members secured thereto and a cross brace connecting the front ends of said bracket members and spaced from said side plates, said bracket members having their inner edges beveled.

8. In a box press, a main supporting frame having side and end standards, and cross braces connecting the same together, said end standards having grooves forming guides, a box receiving bed or top supported by said main frame, means carried by said top to form a guide and stop for the box, arms having clamping heads and tongues to slide in said grooved guides, a cross head carried by said arms having hubs for entering said grooved guides, combined with means for normally holding said arms with their tongues out of said grooved guides, another means for first drawing said arms with their tongues into alinement with said grooved guides and upon further movement drawing said arms down with their tongues into said grooved guides, the clamping heads of said arms comprising side plates and bracket members secured thereto, a cross brace connecting the front ends of said bracket members and spaced from said side plates, said bracket members having their inner edges beveled, and springs secured to the inner surfaces of such side plates.

9. A box press, comprising a main frame consisting of base timbers and spaced posts together with braces connecting said posts, said posts having grooved guides, combined with arms having tongues slidable in said grooved guides, and hub portions spaced from said tongues and also slidable in said grooves to give the arms a pivotal connection with said grooved standards or posts, said arms having clamping heads for engaging a box and said frame having a box receiving portion, and means for operating said arms.

10. A box press, comprising a main frame consisting of base timbers and spaced posts together with braces connecting said posts, said posts having grooved guides, combined with arms having tongues slidable in said grooved guides, and hub portions spaced from said tongues and also slidable in said grooved guides to give the arms a pivotal connection with the grooved standards or posts, said arms having clamping heads for engaging a box and said frame having a box receiving portion, means for normally holding said arms with their tongues out of the grooved guides of the standards to separate their clamping heads.

11. A box press, comprising a main frame consisting of base timbers and spaced posts together with braces connecting said posts, said posts having grooved guides, combined with arms having tongues slidable in said grooved guides, and loop portions spaced from said tongues and also slidable in said grooves to give the arms a pivotal connection with the grooved standards or posts, said arms having clamping heads for engaging a box and said frame having a box receiving portion, means for normally holding said arms with their tongues out of the grooved guides of the standards to separate their clamping heads, and another means for first drawing the clamping heads toward one another to bring the tongues of the arms into alinement with the grooved guides and then upon further movement drawing said tongues into said grooved guides.

12. In a box press, a main frame, clamping arms, and means for operating said clamping arms, combined with a box receiving top supported by the main frame and having a back stop and corner stop plates, and a standard forming a stop projected upwardly from said back stop.

13. In a box press, a main frame, clamping arms, and means for operating said clamping arms, combined with a box receiving top supported by the main frame and having a back stop and corner stop plates, and a standard forming a stop projected upwardly from said back stop, together with a supplemental top supported by said first mentioned top.

14. In a box press, a main frame, clamping arms, and means for operating said clamping arms, combined with a box receiving top supported by the main frame, and having a back stop and corner stop plates, and a standard forming a stop projected upwardly from said back stop, together with a supplemental top supported by said first mentioned top, said supplemental top being of less length than the back stop to leave board receiving spaces at the ends thereof.

15. In a box press, a main frame, clamping arms, and means for operating said clamping arms, combined with a box receiving top supported by the main frame, and having a back stop and corner stop plates, and a standard forming a stop projected upwardly from said back stop, together with a supplemental top supported by said first mentioned top, and a nail holding cup secured to said standard.

ROBERT H. BOWMAN.

Witnesses:
H. L. PLUMMAR,
M. H. McQuown.